Figure 1:
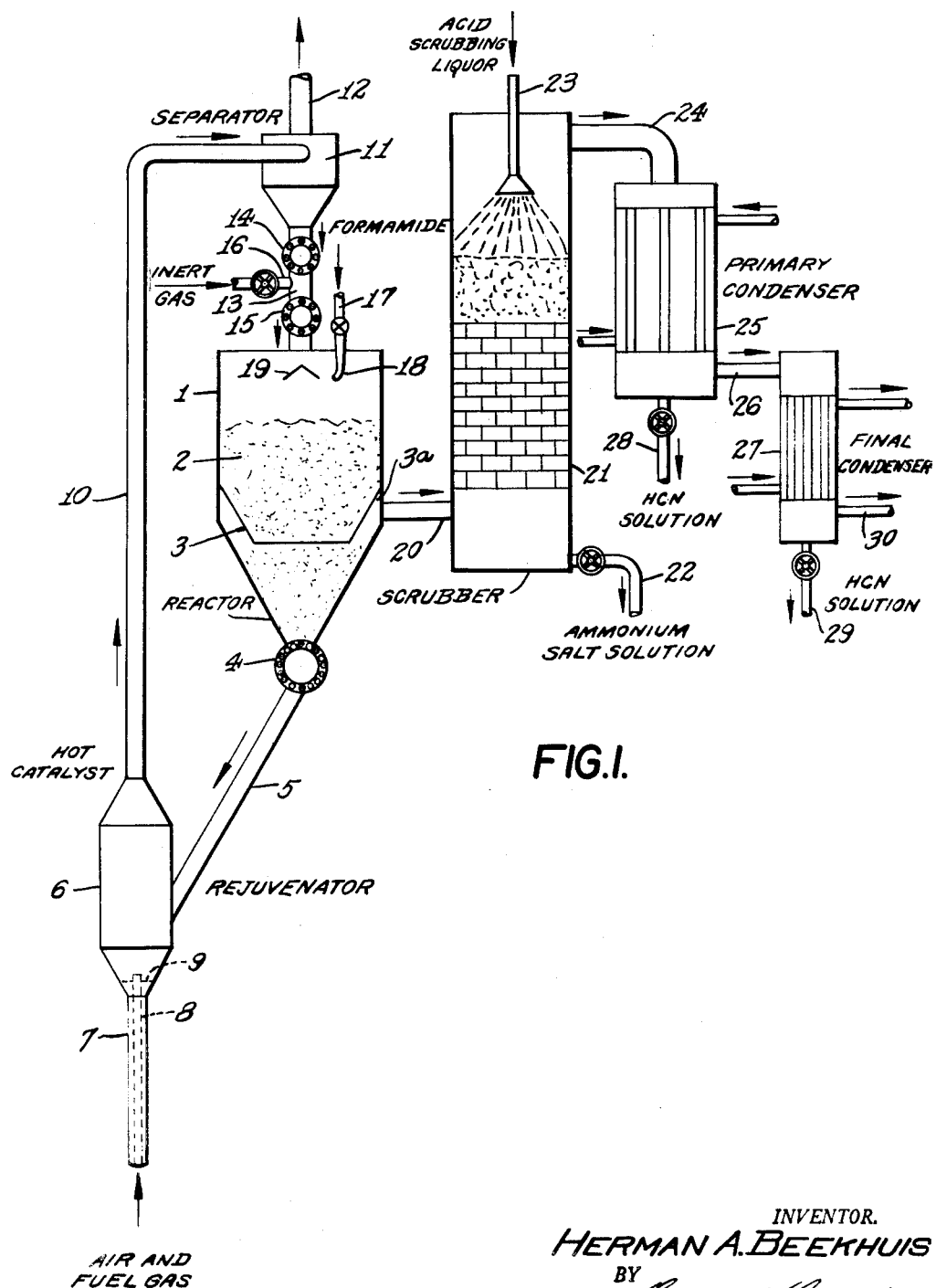

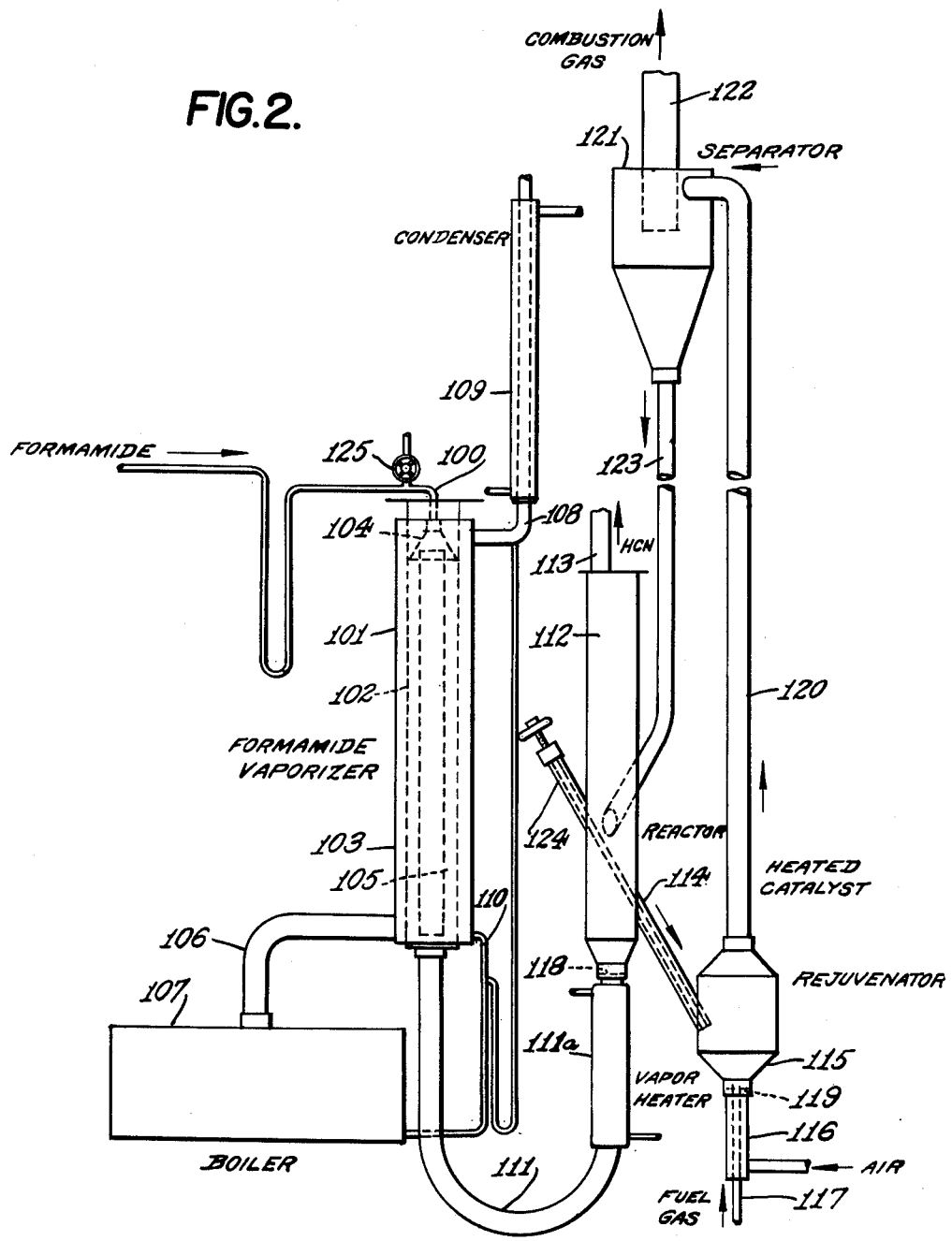

Patented July 22, 1952

2,604,380

UNITED STATES PATENT OFFICE 2,604,380

MANUFACTURE OF HYDROGEN CYANIDE

Herman A. Beekhuis, Middletown Township, Delaware County, Pa., assignor to Allied Chemical & Dye Corporation, a corporation of New York Application October 1, 1946, Serial No. 700,499

10 Claims. (Cl. 23—151)

This invention relates to the manufacture of hydrogen cyanide by the catalytic decomposition of formamide.

Formamide is decomposed catalytically at temperatures between 400° and 700° C. by a variety of catalytic materials to produce hydrogen cyanide and water. It also is decomposed to ammonia and carbon monoxide. This second decomposition may take place to a large or small extent depending upon the conditions of decomposition. Thus the decomposition yields ammonia and carbon monoxide almost exclusively when an activated alumina catalyst is employed at 400° C., whereas when an alundum catalyst is employed at 500° to 700° C., most of the formamide is decomposed to hydrogen cyanide and water.

Catalysts which promote the formation of hydrogen cyanide in preference to ammonia are metals or metallic oxides such as magnesium oxide, zinc, zinc oxide, copper, copper oxide, brass, aluminum, aluminum oxide, tin oxide, manganese oxide, calcium oxide, and the like. Other compounds also may be employed, for instance, magnesium sulfate, calcium sulfate, pumice, Carborundum, and Pyrex glass. While catalysts, such as iron oxide, nickel oxide, and chromium oxide promote the formation of hydrogen cyanide, they usually lead to the formation of considerable proportions of ammonia.

Alloys composed of or containing metals of the group consisting of iron, nickel and chromium constitute an especially desirable class of construction materials for use at the high temperatures involved in the reaction. However, when such metals are employed for constructing tubular converters of the externally heated catalyst tube type they result in a substantial reduction of hydrogen cyanide yield and an increase in the formation of ammonia.

In the manufacture of hydrogen cyanide in the presence of many of the aforementioned catalysts a secondary decomposition takes place to a minor extent forming carbon. Ordinarily this decomposition is not large enough to reduce materially the yield of the desired product, but it tends to deposit carbon upon the catalyst and to reduce the effective catalyst surface. Consequently, in order to maintain a high degree of catalytic activity it is necessary periodically to regenerate or reactivate the catalyst. This may be accomplished merely by burning off the carbon by means of hot air or other oxidizing gas. When the catalyst is contained in an externally heated ferrous metal container, the periodic regeneration of the catalyst seems to augment the undesired reaction leading to ammonia formation. While the regeneration of catalyst in brass, aluminum, bronze or Everdur catalyst tubes is not attended by this disadvantage, such tubes are not adapted for operations employing the high temperatures of reaction involved in formamide decomposition to hydrogen cyanide and consequently may creep or warp unless special precautions are taken to prevent the adverse temperature effects.

It is an object of the present invention to provide a process for manufacture of hydrogen cyanide in high yields for extended operating periods. A further object of the invention is to provide a process which permits a low ratio of exposed reactor surface to exposed catalyst surface. A further object of the invention is to provide a process which permits the use of reaction vessels composed of or containing iron, nickel, chromium, or any other suitable structural material without substantial adverse effect upon the yield of hydrogen cyanide or the activity of the catalyst mass. Further objects of the invention will be apparent from the following detailed description and specific illustrations of my process and apparatus for carrying it out.

In accordance with the process of this invention formamide is subjected to catalytic decomposition to hydrogen cyanide by direct contact with a moving HCN-forming catalyst which is alternately contacted directly with hot combustion gas to supply heat to the catalyst and with formamide to effect the catalytic decomposition.

The catalyst may consist of particles of hydrogen-cyanide-forming catalytic material or of coatings of such material deposited on a suitable support, such as alundum, pumice, Carborundum, fitted glass, silica gel, kieselguhr, and so forth. The hot combustion gases, during at least a portion of the contact periods, should contain free oxygen so as to burn any carbon from the catalyst.

Because in my process the heat required for the decomposition is supplied directly to the catalyst, the reactor may be designed with a minimum of exposed surface. For the same reason the walls of the reactor during operation are not at a higher temperature than the catalyst surface, as in the case of an externally heated catalyst tube, and undesirable surface effects of the exposed reactor surface are minimized. As a consequence it is possible to construct the reaction vessel of structural metals such as iron, nickel alloys, chromium steel, or chromium nickel steel while avoiding any substantial deleterious effect of the structural material upon the yield of hydrogen cyanide.

In applying my process, several different embodiments are possible.

The catalyst mass may advantageously comprise a heterogeneous body of catalyst deposited on large and small particles of supporting material. Thus the particle size may range from particles of one-inch diameter or larger down to $\frac{1}{16}$-inch diameter or smaller. The large particles provide heat-storing capacity while the smaller particles fill the interstices and reduce the free space in the reaction vessel.

I have found that it is possible to withdraw the catalyst from the reaction chamber, pass it through external heating means for raising the catalyst temperature and then return it to the reaction chamber. Thus the catalyst goes through a two-phase cycle. This procedure has the advantage that the production of hydrogen cyanide may be carried on continuously in the reactor. It is also possible by this procedure to provide continuous cocurrent flow of catalyst and reaction mixture through the reactor so as to maintain a constant low temperature at the outlet end of the reactor.

The catalyst may be circulated through the catalytic reactor and an external rejuvenator or reheater in any suitable manner. The catalyst may be caused to descend into the reactor by gravity and to pass thence into a heater of any suitable type, such as a rotary kiln through which heating and oxidizing gas is passed, and the reheated and rejuvenated catalyst may be returned to the top of the reactor by conventional conveying means. One satisfactory method has been found to be the use of a gas elevator employing sufficiently high velocity combustion gas to lift the catalyst particles to the height necessary for returning them to the top of the reactor. The fluidized catalyst technique also may be applied to my process with highly successful results. In this case the catalyst is maintained in the reactor in a fluidized condition by means of formamide vapor or diluent gas, or both, and the catalyst is allowed to flow from the reactor into a reheater and rejuvenator, from which it may be conveyed back to the reactor as previously described.

The mechanical method most suitable for circulating the catalyst will depend in considerable measure on the physical form of the catalyst employed. The catalyst may be supported or unsupported and the particles may be in the form of granules, pellets, spheres, etc. When a fluidized catalyst is employed, catalyst particles of 20-40 mesh size (std. screen scale, mash per inch) or smaller are convenient. When non-fluidized catalyst beds are employed, catalyst particles of substantially larger size, for instance from 2 to 8 mesh size, are sometimes more satisfactory since they permit a lower pressure drop through the catalyst bed and slower catalyst circulation.

The invention is not limited to any particular size of particles and mesh sizes substantially larger and substantially smaller than those specified are within the purview of the invention. When supported catalysts are under consideration, the particle sizes have reference to the coated particles of the support. Particles approaching spherical shape are of advantage in facilitating flow of catalyst from the mass. Aluminum beads or hollow spheres of suitable size are especially satisfactory for moving, non-fluidized catalyst masses. In order to facilitate flow from such a mass, the equipment may be provided with a vibrator to induce uniform flow of catalyst. In the case of a fluidized catalyst also a vibrator may be employed in commencing operations to assist in fluidizing the catalyst. However, its use during the reaction is unnecessary since the catalyst retains its fluidized state once this has been attained.

When catalysts which undergo a valence change in the rejuvenation step, for example manganese oxides are employed, the treatment of the catalyst with hot combustion gas may be followed by treatment with a reducing gas, for instance producer gas, to remove oxygen from the catalyst before the next formamide contact. If this is not done, the catalyst will be reduced by the formamide or hydrogen cyanide with a corresponding small reduction in yield of the desired product.

The decomposition step of the process of the invention may be carried out in the presence or absence of diluent gases, such as ammonia or tail gas from the system, and the reaction products may be treated in conventional manner for recovery of hydrogen cyanide.

Because of the polymerizing effect of ammonia upon hydrogen cyanide in liquid phase, it is preferred to effect separation of ammonia from the reaction gas mixture and then to recover the hydrogen cyanide separately. Ammonia may be removed by washing the gases with dilute acid. The hydrogen cyanide may be condensed along with by-product water or it may be absorbed in an aqueous sodium hydroxide solution to form sodium cyanide. Other conventional recovery methods may of course be employed. When ammonia is recovered by scrubbing the gases with dilute acid solution, an ammonium salt is formed and, if desired, this may be recirculated with or without the addition of make-up acid until the ammonium salt content of the scrubbing fluid has attained a suitable concentration for economical recovery. As scrubbing media aqueous mineral acids, such as sulfuric acid and phosphoric acid, may be employed in concentrations of about 10% at scrubbing temperatures of 80°-90° C.

The invention is further illustrated in the accompanying drawing wherein Fig. 1 shows schematically one form of apparatus suitable for carrying out the invention, and Fig. 2 shows a preferred reactor-rejuvenator assembly.

With particular reference to Fig. 1, reactor 1 is charged with a catalyst mass 2. Within reactor 1 frusto-conical skirt 3 provides an annular free space 3a for withdrawal of gases. The bottom of the reactor is conical and joined to star valve 4 for the regulated withdrawal of catalyst from the bottom of the reactor. From valve 4 a gravity flow line 5 leads to rejuvenator 6 having air duct 7 and fuel inlet pipe 8 for heating and burning off carbon from the catalyst. A screen 9 at the bottom of the heater prevents catalyst particles from falling into the air duct 7 when the flow of air is shut off.

The rejuvenator 6 is a simple vessel having an opening at the top connected with a vertical conduit 10 which leads up to a point above the reactor and thence by a horizontal extension to separator 11, shown as a cyclone type of separator, for separating catalyst particles from the gas stream. Separator 11 has a centrally located exhaust conduit 12 for disposal of combustion gas. From the bottom of separator 11 duct 13 leads to reactor 1. Valve 14 of the same type as valve 4 is provided on this duct for preventing flow of gas between the separator and the reactor while permitting flow of catalyst. In order to effectually seal reactor 1 from separator 11 and prevent loss of formamide vapor into the separator, a second valve 15 of the same type as valve 14 is provided immediately above reactor 1. A side line 16 permits introduction of an inert gas into duct 13 between valves 14 and 15 so that a sufficiently elevated gas pressure may be maintained in this section to prevent any flow of gas up through the section to separator 11.

Inlet pipe 17 is provided into reactor 1 for introduction of formamide. This pipe is preferably provided with a spray nozzle 18 for distributing the liquid formamide over the surface of the catalyst bed which acts as a vaporizer. Reactor 1 also is provided with a deflector 19 arranged below duct 13 to promote uniform distribution of catalyst in the reactor. Leading off from free space 3a in reactor 1 is a vapor outlet pipe 20 which connects with the scrubbing tower 21, shown as a conventional packed tower. The tower 21 has liquid draw-off 22 for used scrubbing liquid and spray pipe 23 for introducing the scrubbing liquid into the tower. Conduit 24 leads from the top of the tower to primary cooler 25 and conduit 26 leads from this cooler to the final cooler 27. The coolers 25 and 27 are provided with liquid withdrawal lines 28 and 29 for removal of condensate. A vapor line 30 from the bottom of final cooler 27 may pass to a vent or, if desired, may be connected with line 16 through a booster pump (not shown) for supplying tail gas to line 13 as previously described.

In operation of this apparatus the reactor 1 is charged with granular or other catalytic material capable of flowing through the system and valve 4 is operated automatically to feed catalyst from the reactor to the rejuvenator 6. Sufficient combustion gas at about 800° C. to 2000° C. and containing about 1% to 10% free oxygen by volume is supplied to the rejuvenator to heat the catalyst to a temperature 50° to 100° higher than the temperature at which it leaves the reactor. The combustion gas may be obtained by burning natural or manufactured gas or fuel oil with excess air. Sufficient air is supplied to maintain a velocity capable of blowing the catalyst up pipe 10 to separator 11, and during at least part of the time to provide excess oxygen for burning off deposited carbon. Combustion gases pass out of separator 11 via conduit 12 to a suitable stack. Catalyst settles in the separator 11 and by operation of valves 14 and 15 is continuously returned to the reactor. When the catalyst in the reactor has attained the desired reaction temperature, say 500° C., formamide is introduced through inlet pipe 17. Upon ejection from nozzle 18 the formamide liquid in the form of spray is practically instantly vaporized either in the vapor space above the catalyst mass or upon the surface of the catalyst mass and the vapors pass down through the mass to vapor space 3a, from which vapors pass out of reactor 1 to scrubber 21. Aqueous 10% sulfuric acid scrubbing solution is sprayed into the top of scrubber 21 in sufficient quantity to remove ammonia from the gas-vapor mixture. The scrubbing solution may be recirculated through suitable recirculating means (not shown). This scrubbing operation cools the vapor to a temperature of about 80° C. and may concentrate the scrubbing solution somewhat by evaporation of water. The cooled vapors pass to cooler 25 where they are further cooled by indirect heat exchange with water to a temperature of 20° to 30° C. Water containing hydrogen cyanide in solution is withdrawn from outlet 28. Uncondensed vapors pass to the final cooler 27 where they may be further cooled by a refrigerated brine solution to a temperature of 10°–20° C. to recover any residual hydrogen cyanide. If desired, the vapors from the primary cooler 25 may pass to a sodium hydroxide scrubber (not shown) for complete removal of the hydrogen cyanide, or residual vapors from the final cooler may pass to such a scrubber for the same purpose.

With particular reference to Fig. 2 which illustrates an apparatus involving fluidized catalyst principles, a gas and liquid inlet 100 leads into a vaporizer 101 comprising a tube 102 provided with jacket 103 for heating fluid and distributing cone 104 for distributing liquid formamide on the surface of the tube 102. In order to reduce the vapor space within tube 102, a tube 105 with ends sealed off is arranged therein. Jacket 103 is connected by pipe 106 with boiler 107 for heating fluid and, by means of pipe 108, is connected with condenser 109 for condensing heating fluid vapor. Both jacket 103 and line 108 are connected with condensate return line 110 for returning heating fluid condensate to boiler 107.

From the bottom of vaporizer 101 a vapor conduit 111, provided with a vapor superheater 111a, leads to reactor 112 which is shown as a vertical cylindrical tube having a vapor outlet 113 at the top. This vapor outlet corresponds to pipe line 20 of Fig. 1 and may lead to similar recovery apparatus. From a point near the bottom of reactor 112 a steeply inclined tube 114 leads to rejuvenator 115 similar to that shown in Fig. 1 and provided with an air inlet conduit 116 and fuel gas inlet 117. Screens 118 and 119 are provided at the bottom of reactor 112 and rejuvenator 115 to prevent catalyst from falling into the inlet pipes. From the top of rejuvenator 115 pipe 120 leads to separator 121 from which a gas conduit 122 passes to a vent and a catalyst conduit 123 leads back to reactor 112 at a location near the midpoint thereof. Valve 124 is provided for controlling the flow of catalyst from reactor 112 to rejuvenator 115. In this system flow of combustion gas into the reactor 112 via conduit 123 is avoided by maintaining in the reactor at the level of the catalyst inlet a gas pressure approximating that in separator 121, or vice versa.

In operation of the apparatus illustrated in Fig. 2, vaporizer 101 is heated to a temperature between 250° and 300° C. by means of the heating liquid in boiler 107. An inert gas such as a mixture of carbon dioxide and hydrogen is passed through vaporizer 101 and preheater 111a at a sufficient rate to maintain the catalyst in reactor 112 in a fluidized condition. Valve 124 is opened to permit flow of catalyst into the rejuvenator 115 and air and fuel gas are introduced through conduits 116 and 117. This and the inert gas heated in preheater 111a heat the catalyst in the rejuvenator and in the reactor. The flow of gas in the rejuvenator is such that it carries catalyst particles up line 120 to separator 121 from which they are returned via conduit 123 to reactor 112. When the catalyst has attained the appropriate reaction temperature, liquid formamide is introduced through inlet 100, overflows the cone 104 and is vaporized on the wall of tube 102. At the same time the quantity of inert gas is reduced and finally cut off. The vapor now takes the place of the inert gas and passes up through the catalyst, which it maintains in a fluidized condition, and which acts upon the vapor to cause it to decompose into hydrogen cyanide and water vapor. The resulting vapors pass out of the reactor through vapor line 113 by which they are conveyed to suitable scrubbing and recovery apparatus, such as that illustrated in Fig. 1.

The following example shows results of operation of an apparatus entirely of 18-8 chromium nickel iron alloy arranged as shown in Fig. 2 of the drawing and serves further to illustrate the invention.

Reactor 112 was charged with a catalyst consisting of 20-36 mesh particles of porous alundum coated with zinc oxide by impregnating the porous alundum with zinc nitrate solution and heating the impregnated mass to 500° C. The catalyst contained 4.8% by weight zinc oxide by analysis. During operation the heater was controlled to maintain the temperature of catalyst entering the reactor at about 600-650° C.; under these conditions maximum temperatures recorded within the reactor were usually between 530° C. and 590° C. Formamide was introduced into the reactor at vapor temperatures of about 300°-400° C. at the rate of about one part by weight for each ten parts by weight of catalyst introduced into the reactor from rejuvenator 115. Occasionally additional catalyst was added to replace catalyst lost by abrasion. These additions amounted to about 1% by weight of the formamide introduced. Operating under the conditions yields of hydrogen cyanide of 85-87% of theoretical, based on formamide introduced, were consistently obtained. After about 60 hours of operation no decrease in catalyst activity or HCN yield was observed.

When a corresponding reaction was carried out in a stationary catalyst bed in an 18-8 chromium-nickel iron alloy tube externally heated to maintain the reaction temperature, yields of about 80% were obtained initially, and decreased gradually thereafter to about 74%.

I claim:

1. In the manufacture of hydrogen cyanide by the catalytic decomposition of formamide in contact with an HCN-forming catalyst, the improvement which comprises passing formamide vapor at a temperature below the prevailing decomposition temperature into direct contact with a moving HCN-forming catalyst at a temperature between 400° and 700° C. and intermittently reheating the catalyst to a temperature above the decomposition temperature and at least 200° C. above the entering formamide vapor temperature by direct contact of the active catalyst surface with a hot combustion gas mixture to supply the heat of decomposition, at least part of the reheating gas mixture containing free oxygen.

2. In the manufacture of hydrogen cyanide by the catalytic decomposition of formamide in the presence of an HCN-forming catalyst, the cyclic process which comprises alternately passing formamide vapor at a temperature below the prevailing decomposition temperature into contact with a moving HCN-forming catalyst at a temperature between 400° and 700° C. to decompose the formamide and produce hydrogen cyanide, thereby cooling the catalyst, in one phase of the cycle and passing a hot combustion gas mixture at a temperature higher than the catalyst temperature and containing, at least part of the time, free oxygen into direct contact with the active catalyst surface until the temperature of the catalyst is raised above the decomposition temperature and at least 200° C. above the entering formamide vapor temperature in the other phase of the cycle to supply the heat of decomposition.

3. In the manufacture of hydrogen cyanide by the catalytic decomposition of formamide in the pressure of an HCN-forming catalyst in a reactor whose walls are composed of a structural metal of the group consisting of iron, nickel, and chromium and their alloys, the improvement which comprises passing formamide vapor at a temperature below the prevailing decomposition temperature and essentially free of oxygen into contact with a moving HCN-forming catalyst at a temperature between 400° and 700° C. in said reactor, while the walls of the reactor are at a temperature not higher than the catalyst temperature, and intermittently reheating the catalyst to a temperature above the decomposition temperature and at least 200° C. above the entering formamide vapor temperature by direct contact of a hot combustion gas mixture containing free oxygen with the active catalytic surface of the catalyst to supply the heat of decomposition and to prevent substantial accumulation of carbon on the catalyst surface.

4. In the manufacture of hydrogen cyanide by the catalytic decomposition of formamide in the presence of an HCN-forming catalyst in a reactor whose walls are composed of a structural metal of the group consisting of iron, nickel, and chromium and their alloys, the improvement which comprises passing formamide vapor at a temperature below the prevailing decomposition temperature into direct contact with a moving HCN-forming catalyst at a temperature between 400° and 700° C. in said reactor while the walls of the reactor are at a temperature not above the catalyst temperature, withdrawing catalyst from the reactor, heating it externally by direct contact with a hot combustion gas mixture containing free oxygen to a temperature above the decomposition temperature and at least 200° C. above the entering formamide vapor temperature, and returning the heated catalyst to the reactor.

5. The method of claim 4 wherein the catalyst flows from said reactor by gravity and is blown by said combustion gas mixture to an elevation substantially above the reactor and descends by gravity to the reactor.

6. The method of claim 4 wherein the catalyst during the formamide decomposition is maintained in a fluidized state.

7. In the manufacture of hydrogen cyanide by the catalytic decomposition of formamide in the presence of an HCN-forming catalyst in a chromium, nickel, iron alloy reactor, the improvement which comprises passing formamide vapor at a temperature below the prevailing decomposition temperature and essentially free of oxygen through a mass of a moving HCN-forming catalyst at a decomposition temperature between 400° and 700° C. in said chromium-nickel-iron alloy reactor so that heat of decomposition is supplied by the sensible heat of the catalyst and the walls of the reactor are at a temperature not above the catalyst temperature, withdrawing catalyst from the reactor, heating it externally by direct contact with a combustion gas mixture containing free oxygen to a temperature above the decomposition temperature and at least 200° C. above the entering formamide vapor temperature thereby restoring sensible heat lost to the decomposition and removing carbon from the catalyst surface, and returning the heated catalyst to the reactor.

8. The method of claim 7 wherein the catalyst flows from said reactor by gravity and is blown by said combustion gas mixture to an elevation substantially above the reactor and descends by gravity to the reactor.

9. The method of claim 7 wherein the catalyst during the formamide decomposition is maintained in a fluidized state.

10. The method of claim 7 wherein the catalyst is maintained in a fluidized state in said reactor, flows from the reactor by gravity, and is blown by said hot combustion gas mixture to an elevation substantially above the reactor and returns by gravity to the reactor.

HERMAN A. BEEKHUIS.

REFERENCES CITED

The following references are of record in the file of this patent:

UNITED STATES PATENTS

| Number | Name | Date |
|---|---|---|
| 1,608,700 | Lacy | Nov. 30, 1926 |
| 1,951,520 | Munch et al. | Mar. 20, 1934 |
| 2,086,507 | Larson | July 6, 1937 |
| 2,239,801 | Voorhees | Apr. 29, 1941 |
| 2,290,580 | Degnen et al. | July 21, 1942 |
| 2,303,680 | Brueckmann | Dec. 1, 1942 |
| 2,311,564 | Munday | Feb. 16, 1943 |
| 2,331,433 | Simpson et al. | Oct. 12, 1943 |
| 2,350,730 | Degnen et al. | June 6, 1944 |
| 2,432,344 | Sinclair | Dec. 9, 1947 |

FOREIGN PATENTS

| Number | Country | Date |
|---|---|---|
| 58,960 | Sweden | June 5, 1923 |

OTHER REFERENCES

Hamlin et al., "Chemical Resistance of Engineering Materials," page 257. New York, Chemical Catalog Co., 1923.